United States Patent [19]

Takahashi et al.

[11] Patent Number: 5,105,381
[45] Date of Patent: Apr. 14, 1992

[54] WORD PROCESSOR WITH SELECTABLE LINE-LENGTHS WHICH USES MEMORY TABLE FOR DETECTING CHARACTERS NOT PERMITTED AT LINE-HEAD OR LINE-END

[75] Inventors: Masamitsu Takahashi, Nara; Kazuhiko Takata, Yamatokoriyama, both of Japan

[73] Assignee: Sharp Kabushiki Kaisha, Osaka, Japan

[21] Appl. No.: 42,215

[22] Filed: Apr. 24, 1987

[30] Foreign Application Priority Data

Apr. 30, 1986 [JP] Japan ................................. 61-102986

[51] Int. Cl.$^5$ ............................................. G06F 3/00
[52] U.S. Cl. ............................... 395/100; 364/225.6;
364/225.7; 364/943.43; 364/943; 364/DIG. 1;
364/DIG. 2
[58] Field of Search .................... 400/61, 62, 63, 64,
400/70, 74, 110; 364/200 MS File, 900 MS
File, 518, 519

[56] References Cited

U.S. PATENT DOCUMENTS

| | | | |
|---|---|---|---|
| 3,386,552 | 6/1982 | Lorber | 400/63 |
| 3,895,704 | 7/1975 | Norris | 400/62 |
| 3,974,493 | 8/1976 | de Cavaignac et al. | 364/900 |
| 3,987,415 | 10/1976 | Boyd | 364/900 |
| 4,054,948 | 10/1977 | Grier et al. | 364/900 |
| 4,087,852 | 5/1978 | Campbell | 364/200 |
| 4,244,031 | 1/1981 | Izushima et al. | 364/900 |
| 4,330,217 | 5/1982 | Churgovich | 364/900 |
| 4,354,765 | 10/1982 | Buchanan | 364/900 |
| 4,408,302 | 10/1983 | Fessel et al. | 364/900 |
| 4,420,817 | 12/1983 | Yoshida | 364/900 |
| 4,462,701 | 7/1984 | Czyszewski | 364/900 |
| 4,523,294 | 6/1985 | Winn | 364/900 |
| 4,573,138 | 2/1986 | Gaudet et al. | 400/63 |
| 4,595,997 | 6/1986 | Parmet | 364/900 |
| 4,812,999 | 3/1989 | Ohara | 364/518 |

FOREIGN PATENT DOCUMENTS

| | | | |
|---|---|---|---|
| 1189977 | 2/1985 | Canada | 354/229 |
| 0163503 | 4/1985 | European Pat. Off. . | |

OTHER PUBLICATIONS

IBM Technical Disclosure Bulletin, vol. 29 No. 12 May 1987 (Positioning of top or end inhibited character.) pp. 5432-5433.

Primary Examiner—Thomas C. Lee
Assistant Examiner—Eric Coleman

[57] ABSTRACT

A word processor incoporating: for executing line decisions by allowing the operator to select nonpermissible characters used in identifying prohibited characters in the line-head, line-end, and line-head/line-end portion of an inputted sentence. The disclosed word processor includes a first memory for storing nonpermissible characters by dividing them into a plurality of groups; keys designating specific groups of nonpermissible characters; a second memory for storing information denoting groups of designated nonpermissible characters; a line-head and/or line-end identification circuit; and a line decision circuit which executes line decisions against the designated groups of nonpermissible characters in accordance with the contents of the second memory when line-head or line-end position is identified by the line-head and/or line-end identification circuit.

8 Claims, 3 Drawing Sheets

WORD PROCESSOR WITH SELECTABLE LINE-LENGTHS WHICH USES MEMORY TABLE FOR DETECTING CHARACTERS NOT PERMITTED AT LINE-HEAD OR LINE-END

BACKGROUND OF THE INVENTION

The present invention relates to a word processor which automatically compiles and prints either Japanese or English text using electronic technology such as digital memory and digital logic circuits. More particularly, the present invention relates to a word processor capable of executing line decisions by allowing the operator to freely select a mode for processing characters (or symbols) placed either at the line-head or line-end of a line of sentence data in accordance with the specific requirements of the application being used by the operator.

Conventionally, there are a variety of line-head nonpermissible characters which should not be positioned at the beginning (line-head) of a line of sentence data. ",", ".", ")", or "" (a Japanese Kana character denoting a double consonant), for example. Similarly, there are some line-end nonpermissible characters which should not be positioned at the end (line-end) of a line of sentence data. "(", for example. To prevent this, conventional word processors incorporate a system for automatically executing line decisions in a word processor. If either a line-head nonpermissible character or a line-end nonpermissible character is present at the line-head or at the line-end, respectively this system detects either the line-head character or the line-end character in order to transfer either of these characters to the line-end or line-head line-decision region for automatic compilation of, correct, easy to read sentences.

In addition to those cited above, there are a number of other nonpermissible characters. Conventional word processors execute the line decisions cited above against all the predetermined nonpermissible characters.

However, when operating a word processor, the operator may desire to select one or more of the nonpermissible characters for a specific application. For example, he may desire to use only the period or comma, or a combination of period, comma, parentheses, and the contracted sound symbols.

Conventional word processors merely have the function for uniformly executing line decisions against the predetermined nonpermissible characters; they do not give the operator the option of selecting the desired nonpermissible characters if desired.

SUMMARY OF THE INVENTION

The primary object of the present invention is to provide a novel word processor incorporating a function for executing line decisions which allows the operator to freely select any of those nonpermissible characters (or symbols) which should not normally be present either at the line-head or at the line-end of a line of sentence data.

Another object of the invention is to provide a novel word processor which stores nonpermissible characters (or symbols) which should not appear either at the line-head or at the line-end, and divided into a plurarity of groups, which allows the operator to determine whether or not to apply the line decisions to those groups.

Another object of the invention is to provide a novel word processor which allows the operator to freely select any of those nonpermissible characters (or symbols) which should not be present either at the line-head or at the line-end of a sentence so that the line decisions can be implemented in accordance with the selection of nonpermissible characters.

A still further object of the invention is to provide a novel word processor allowing the operator to select groups of nonpermissible characters (or symbols) so that line decisions suited to a variety of applications can be executed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the following detailed description.

To achieve the objects mentioned above, the word processor related to the invention executes the predetermined line decisions by identifying any nonpermissible characters or symbols either in the line-head or in the line-end before compiling the memory content. The word processor related to the invention incorporates: a first memory for storing nonpermissible characters or symbols by classifying them into a plurality of groups according to their type; keys indicating each group of nonpermissible characters; a second memory for storing data denoting the group of nonpermissible characters indicated by the aforementioned keys; and a line decision circuit for executing the intended line decisions. The line decision circuit identifies the groups of nonpermissible characters and symbols stored in the first and second memories before eventually executing the necessary line decisions in accordance with data from the first memory related to the designated nonpermissible characters (or symbols).

BRIEF DESCRIPTION OF THE DRAWINGS

The present invention will be better understood from the detailed description given hereinbelow and the accompanying drawings, which are given by way of illustration only and thus are not limitative of the invention, in which.

DETAILED DESCRIPTION OF THE INVENTION

Figure 1:
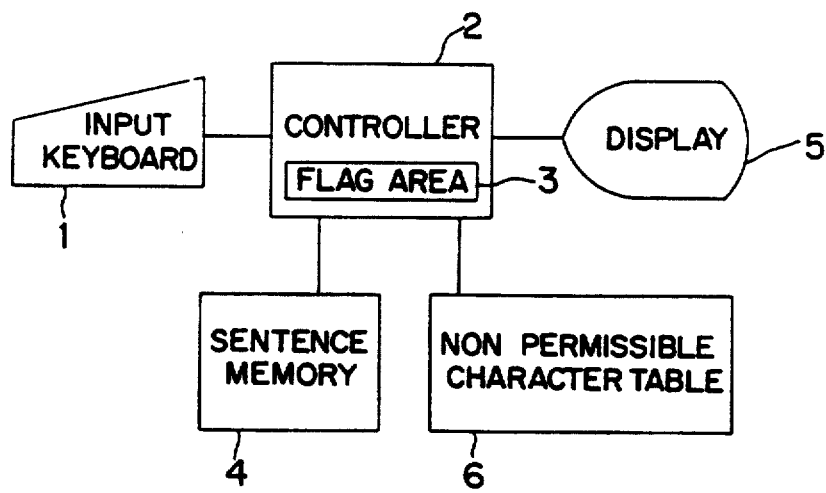
FIG. 1 is the simplified block diagram of the word processor according to the present invention.

FIG. 1 is a simplified block diagram denoting the entire constitution of a preferred embodiment of a word processor according to the present invention. A input keyboard 1 is provided with Kana character keys, character compilation control keys, and a plurality of keys for designating groups of nonpermissible characters. A controller 2 controls the character compiling operations and the entire system operations as well. The controller 2 incorporates a memory (flag) 3, which stores data input via those keys for designating a group of nonpermissible characters. A sentence memory 4 stores sentence data input via the input keyboard 1.

A display unit 5 displays the inputted sentence data. An nonpermissible character table 6 stores nonpermissible characters by classifying these into a plurality of groups, such as tables A, B, and C shown in FIGS. 2(A), 2(B) and 2(C) for example.

Figure 2A:
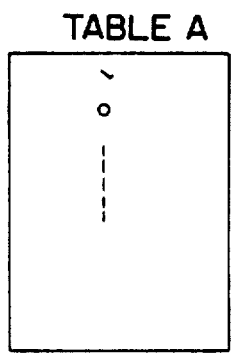
FIGS. 2(A)-2(C) are illustrations of tables containing nonpermissible characters.
Figure 2B:
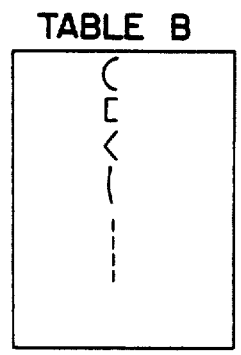
Figure 2C:
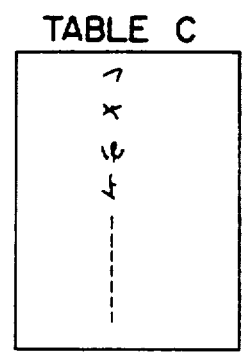

As shown in FIG. 2(A), table A, as part of nonpermissible characters table 5, stores the characters for period, comma, colon, etc. as nonpermissible characters (Here, nonpermissible characters indicate characters and symbols); table B of FIG. 2(B) stores parentheses as nonpermissible characters; and table C of FIG. 2(C) stores contracted sound symbols as nonpermissible characters. The characters stored in Table A are processed as line-head nonpermissible characters; the characters stored in table B are processed as line-end nonpermissible characters; and the characters stored in Table C are processed as line-head/line-end nonpermissible characters. The term "line decisions" denotes the process for shifting any of those nonpermissible characters (or symbols) in line-head or line-end pre-determined regions either to the line-end of the preceding line or to the line-head of the following line.

The term "nonpermissible character" in the preferred embodiments of the present invention denotes any of those characters or symbols which should not be set to the beginning or the end of respective lines, that means any of those characters or symbols which should be deleted from either the line-head or line-end for composing sentences in correct style. For example, those characters which should not be set to the line-head and the line-end are respectively called the "line-head nonpermissible characters" and the "line-end nonpermissible characters". Needless to say, these nonpermissible characters include a variety of symbols. The keys of the input keyboard 1 designating the group of nonpermissible characters allows the operator to select one or more of the tables A, B, and C to be input, so that he can, for example, choose either table A alone, or combine tables A and B or tables A, B, and C together as required.

Figure 3:
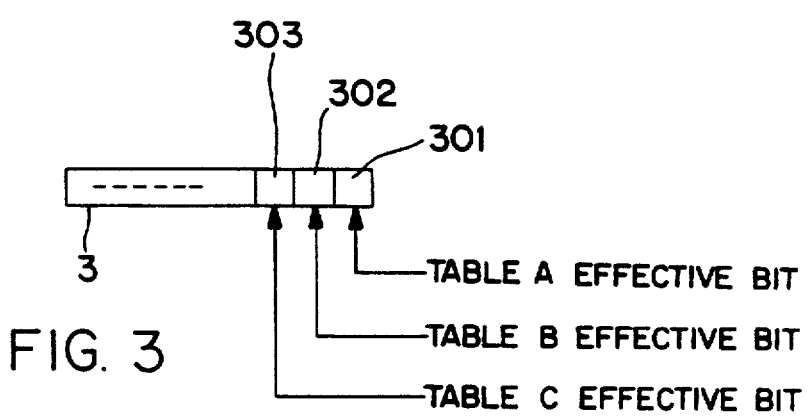
FIG. 3 is a the diagram denoting the state in which data input by a key designating the group of nonpermissible characters is allocated to the flag bit of memory which stores this data.

When the operator operates the keys of the input keyboard 1 designating the group of nonpermissible characters, the memory (flag) 3 of the controller 2 stores the data selected by the operator. FIG. 3 shows the constitution of memory (flag) 3. The memory 3 stores data of a variety of flags. Bit 301 denotes the effective bit of table A. Bits 302 and 303 respectively denote the effective bits of tables B and C. Entry of "1" into each bit denotes that the corresponding table has been selected.

Figure 4:
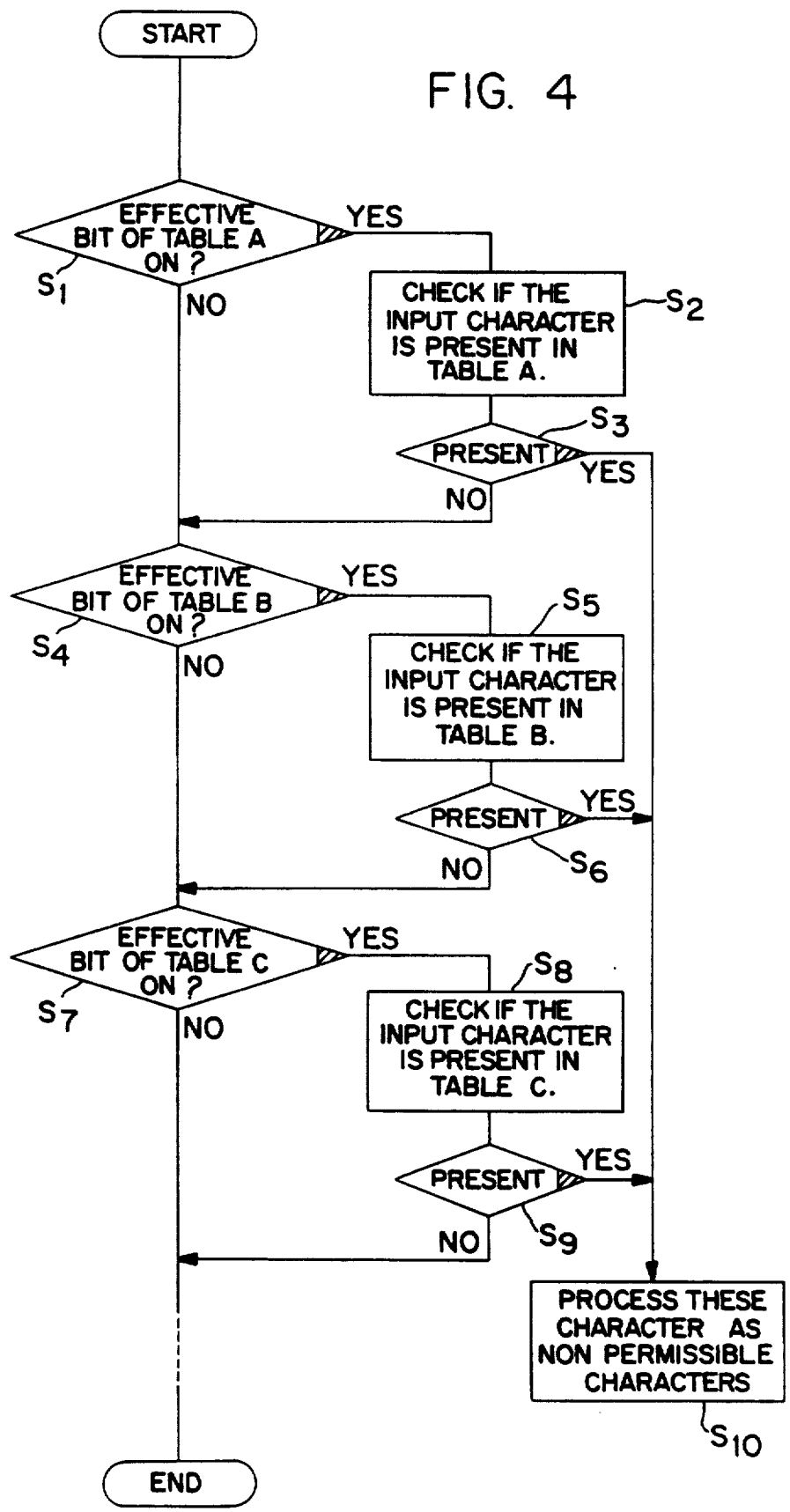
FIG. 4 is the operation flowchart describing the sequential steps for executing the line decisions in the controller.

In accordance with the data shown in FIG. 3, the controller 2 first identifies nonpermissible characters by following the steps of the operation flowchart shown in FIG. 4 before executing the designated line decisions.

Specifically with reference to FIG. 4, when step S1 is entered, the controller 2 first checks flag bit 301 of table A either in the line-head or line-end line decision. If table A is selected, operation mode enters step S2, where the controller 2 checks to see if any of the nonpermissible characters stored in table A is in the nonpermissible region, that is, at the line-head or line-end. If a nonpermissible character from table A is present in the nonpermissible region, operation mode proceeds from step S3 directly to step S10 to allow the controller 2 to execute the line decisions.

If table A has not been selected during step S1 and no nonpermissible character is present during step S2, operation mode proceeds to step S4, where the controller 2 checks to see if table B has been selected by referring to flag bit 302 of table B. If table B has already been selected, then the operation mode proceeds to step S5.

Conversely, if table B has not been selected, then the operation mode proceeds to step S7.

While step S5 is underway, the controller 2 checks to see whether or not any of the nonpermissible characters stored in table B is present in the nonpermissible region. If a nonpermissible character from table B is present in this region, operation mode proceeds from step S6 to step S10, where the controller 2 executes the line decisions. If no nonpermissible character from table B is present in the nonpermissible region, the operation mode then proceeds from step S6 to step S7. When step S7 is entered, the controller 2 checks to see if table C has been selected by referring to flag bit 303 of table C. If table C has already been selected, operation mode proceeds to step S8. If table C has not been selected, the controller 2 then terminates the above serial operation.

While step S8 is underway, the controller 2 checks to see whether or not any of the nonpermissible characters stored in table C is present in the nonpermissible region. If an nonpermissible character from table C is present in the nonpermissible region, operation mode then proceeds from step S7 to step S10, where the controller 2 executes the line decisions. Conversely, if no nonpermissible character is present in the nonpermissible region, after completing step S9, the controller 2 terminates the above serial operation. As discussed above, the operator can select any group of nonpermissible characters by operating the input keys to enter data denoting the group of nonpermissible characters into the memory (flag) 3. Thus, it is possible for the operator to execute line decisions to suit a variety of word processor applications. Furthermore, the word processor related to the invention executes the line decisions by effectively applying the bit constitution shown in FIG. 3 even if the number of groups of nonpermissible characters is increased.

Figure 5:
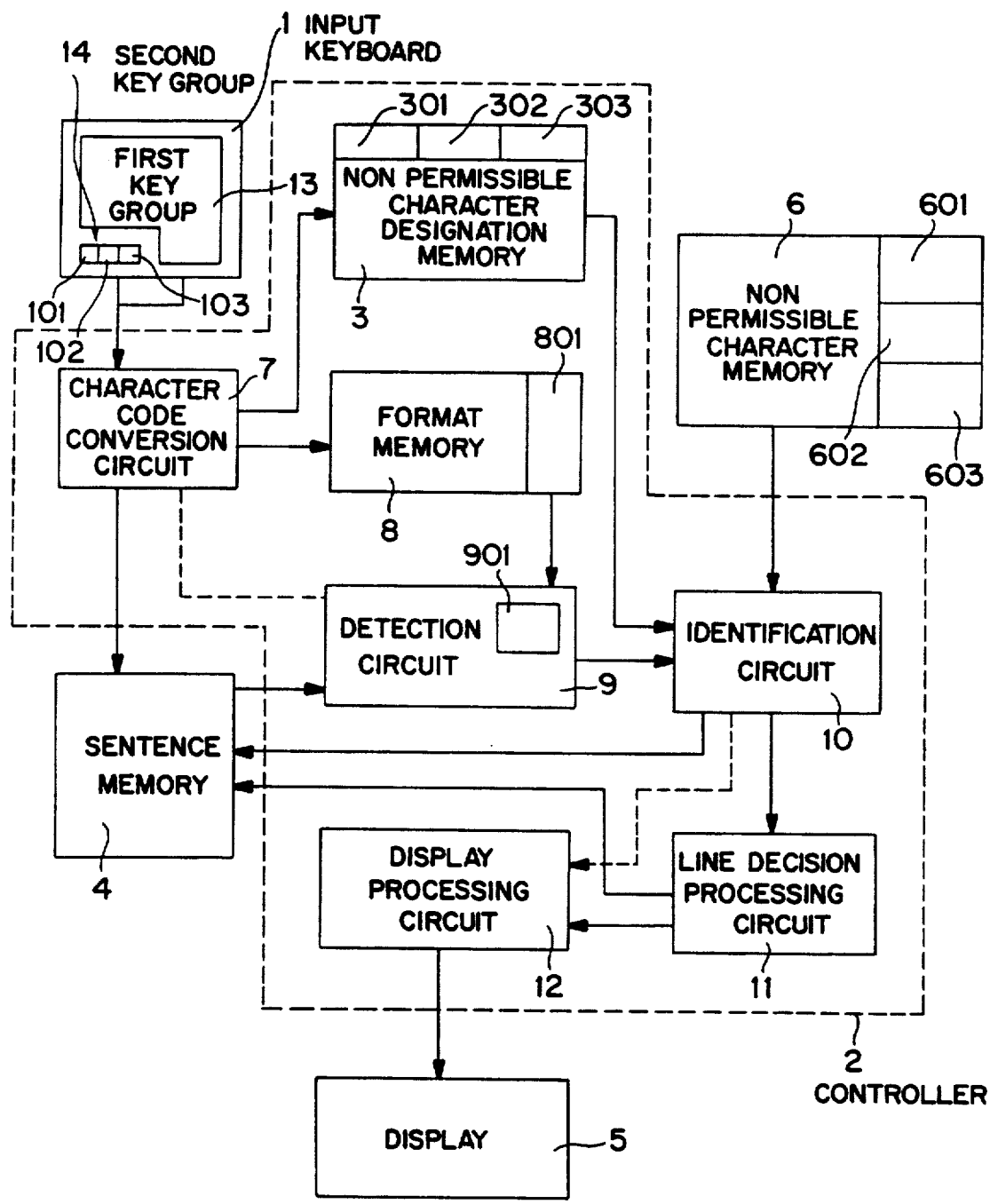
FIG. 5 is the simplified block diagram of the word processor reflecting one according to the preferred embodiments of the present invention.

Referring now more particularly to FIG. 5, a preferred embodiment of the word processor according to the present invention is described below. The word processor related to the invention is substantially provided with the following: the input keyboard 1 composed of the first key group 13, comprising Japanese Kana character keys, alphabetical (roman) character keys, digital keys, symbol keys including parentheses, period, comma, colon, and the like, and a variety of compilation control keys, and the second key group 14, comprising nonpermissible-character-group designation keys 101, 102, and 103; the sentence memory 4 which stores sentence information input from the input keyboard 1; three units of the nonpermissible character memory 6 (601, 602, and 603) which store nonpermissible characters and symbols classified into three groups; the controller 2 which controls all the operations of the input keyboard 1 and memories 4 and 6; and the display means 5 such as cathode ray tube (CRT) or liquid crystal display (LCD) which display sentence information controlled by the controller 2.

Next, the function of the controller 2 is described below. First, before entry of the sentence, when a specific format (which is information denoting the paper size and the number of characters per line, needed for compiling the sentence) is entered via the keyboard 1, this a format is stored in a format memory 8 of the controller 2. Specifically, the number of characters per line is stored in an area 801 of the format memory 8. Simultaneous with the entry of the plurality of nonpermissible character groups 601, 602, and 603 stored in the nonpermissible character memory 6, the group entered is submitted to the actual line decisions needed for compiling the planned sentence, using a nonpermissible character group designation key 101, 102, or 103, nonpermissible character designation data is stored in area 301, 302, or 303 of nonpermissible character designation memory 3. (When the line decisions are executed, binary code "1" is stored in the memory 3. Binary code "0" is stored in the memory 3 when the line decisions is not executed.) Unless new data is input, that data which was previously input to the format memory 8 and the nonpermissible character group designations memory 3 may also be used without modification, or only the entire content of the memory 3 may always be cleared.

Next, simultaneous with the input of the planned sentence via the input keyboard 1, the sentence is converted into corresponding character codes, which are then stored in the sentence memory 4. The sentence data from the sentence memory 4 is then delivered to a line-head and line-end detection circuit 9, incorporating a counter 901 which counts the number of characters contained in the output sentence. The line-head and line-end detection circuit 9 is provided with specific information corresponding to the number of characters per line, stored in the format memory 8. This circuit detects the line-head and the line-end by comparing the number counted by the counter 901 to the number of characters in a line.

Signal output from the line-head and line-end detection circuit 9 is delivered to an nonpermissible character identification circuit 10, which identifies whether or not those characters within the predetermined range (5 to 7 characters) from either the line-head or the line-end are nonpermissible characters. It also identifies whether or not the character at the line-head or the line-end is one of the predetermined nonpermissible characters. In other words, the nonpermissible character identification circuit 10 first identifies to which group of the nonpermissible character memory 6, from 601 to 603, the line-head or line-end character belongs, and then it identifies whether the identified group is designated as nonpermissible in the nonpermissible character designation memory 3 before eventually identifying whether or not either the line-head character or the line-end character is one of the predetermined nonpermissible characters. This circuit may also use an alternative method to identify nonpermissible line-head characters or line-end characters. First, the system identifies which one of a plurality of nonpermissible character groups is designated as nonpermissible by referring to the contents of the nonpermissible designation memory 3, and comparing the character codes of the characters stored in the nonpermissible designation group and the character codes of the characters at the line-head and the line-end before eventually determining the presence or absence of nonpermissible characters.

If one of the characters within the predetermined region (including the line-head and line-end) match with any of the characters in groups 601, 602 or 603, which contain nonpermissible characters specified by the nonpermissible character designation memory 3, then a signal output from the nonpermissible character identification circuit 10 is delivered to a line decision processing circuit 11, which then executes a line decisions to shift the nonpermissible character from the predetermined region of the sentence (including the line-head or the line-end) before compiling the inputted sentence. After the necessary line decisions, the line-head and line-end detection circuit 9 detects either the line-head or the line-end of the following line, starting from either the character to which the line decision is applied or the following character.

The sentence data on which line decisions have been made (or were not needed) is again stored in the sentence memory 4. Instead of using the identical sentence memory 4, the sentence data initially input via the input keyboard 1, and the sentence data on which line decisions have been completed, may be stored in separate memories. If the nonpermissible character identification circuit 10 does not designate characters at the line-head or line-end of a line of sentence data to be nonpermissible, the sentence data is then directly delivered to the sentence memory 4 without being routed to the line-decision processing circuit 11. Finally, all the sentence data, including data complete with the line decisions, is delivered to the display means 5 via a display processing circuit 12 to allow the sentences to be displayed. In addition, it is also possible for the preferred embodiment of the invention to first convert the keyboard-input sentence into character codes by means of the character code conversion circuit 7 for delivery to the line-head and line-end detection circuit 9 before storing those sentences, complete with all the designated processes, into the sentence memory 4.

The above preferred embodiment of the present invention allows the nonpermissible character memory to internally store the characters generally determined to be nonpermissible by classifying them into a plurality of groups, while it also allows nonpermissible designation of characters by keyboard entry to determine whether or not the nonpermissible characters of each group should be submitted to line decisions. In addition, the preferred embodiment also provides a specific function for removing the nonpermissible designation from a specific character of a specific group under the nonpermissible designation. For example, the operator first inputs a character from which he wishes to remove the nonpermissible designation and then presses the nonpermissible designation key to delete the character from the nonpermissible designation memory 3. Note that a character may have its nonpermissible designation removed temporarily. By repeating this operation, the deleted character is again designated as a nonpermissible character. In addition, if it is necessary to apply line decisions to any character which is not included in the group due to a nonpermissible designation, either an additional memory for storing this character which requires nonpermissible designation can be provided, or the character may be stored in the existing nonpermissible character memory. In other words, any individual nonpermissible character can easily be selected by reading into or deleting from the nonpermissible character memory.

The above preferred embodiment of the invention stores nonpermissible characters in the nonpermissible character memory 6 by classifying these into three groups; line-head nonpermissible characters, line-end nonpermissible characters, and line-head/line-end nonpermissible characters, respectively. The memory may also be classified into more than three groups and an additional nonpermissible character memory may also be provided as required.

Basically, the above preferred embodiments of the present invention refer to examples using a Japanese-language word processor. However, these preferred embodiments can also effectively be applied to word processors using other languages. Note that those characters belonging to respective groups of the nonpermissible character memory shown in FIG. 2 are provided for use with a Japanese-language word processor. When applying the above embodiments of the invention to word processors dealing with English, the characters in tables A and B shown in FIG. 2 are generally made available for controlling nonpermissible characters.

As is clear from the above description according to the preferred embodiments of the invention, the operator can select any group of nonpermissible characters while using a word processor so that line decisions suited for a variety of applications can easily and effectively be executed.

While only certain embodiments of the present invention have been described, it will be apparent to those skilled in the art that various changes and modifications may be made therein without departing from the spirit and scope of the present invention as claimed.

What is claimed is:

1. A word processor of a type for making predetermined line decisions with respect to a format from inputted character data, comprising:
   first key input means for entering said character data;
   first memory means for storing said character data;
   second key input means for entering a value representing the total number of characters per selected line, each line comprising a line-head portion and a line-end portion;
   second memory means responsive to a signal from said second key input means for storing the value representing the total number of characters in each line;
   third memory means for storing a plurality of nonpermissible characters, wherein said nonpermissible characters include those characters which should not appear in said line-end and said line-head portion, the third memory means formulated to store the nonpermissible character in a table format;
   line decision designation means for designating the portion of each line with respect to which a line decision is to be made;
   detection means for detecting either a line-head or a line-end by counting the total number of character data input by said first key input means and by comparison of said total number with the corresponding said number stored in said second memory means; and
   identifying means for identifying whether a selected character data in a designated line-head or the line-end portion is a nonpermissible character in response to a signal from the detection means and for identifying which of said plurality of nonpermissible characters should be used to perform said line decision.

2. The word processor of claim 1, further comprising display means responsive to a signal from said identifying means for displaying information composed of said character data including said line-head and line-end portions on which said line decisions are made.

3. The word processor of claim 1 further comprising deletion means for deleting characters from said nonpermissible characters stored in said third memory means.

4. The word processor of claim 1, further comprising addition means for designating additional characters for said nonpermissible characters.

5. The word processor of claim 1, wherein said nonpermissible characters are stored in said third memory means in a plurality of groups, wherein said groups of nonpermissible characters are determined by whether the character should not appear in said line-head portion, said line-end portion, or both said line-head and line-end portions, respectively.

6. The word processor of claim 5 wherein each group is a distinct table format.

7. The word processor of claim 1, further including means for operator entry of the plurality of nonpermissible characters in said third memory.

8. The word processor of claim 1, wherein the line decision designating means can designate the head of a line or the end of a line as the portion of each line.

* * * * *